(12) United States Patent
Prasad et al.

(10) Patent No.: US 11,449,116 B2
(45) Date of Patent: Sep. 20, 2022

(54) POWER GRID POROSITY TECHNIQUES

(71) Applicant: Arm Limited, Cambridge (GB)

(72) Inventors: Soutani Bala Venkatanaga Durga Prasad, Bangalore (IN); Denil Das Kolady, Bangalore (IN); Anand Dhanalakshmi Ramdass, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/584,904

(22) Filed: Sep. 26, 2019

(65) Prior Publication Data

US 2021/0096627 A1 Apr. 1, 2021

(51) Int. Cl.
*G06F 30/394* (2020.01)
*G06F 1/28* (2006.01)

(52) U.S. Cl.
CPC .............. *G06F 1/28* (2013.01); *G06F 30/394* (2020.01)

(58) Field of Classification Search
CPC ........ G06F 1/16; G06F 30/394; G06F 30/392; G06F 3/04847; G06F 30/327; G06F 30/36; G06F 30/39; G06F 1/26; G06F 1/266; G06F 1/28; G06F 2117/10; G06F 3/0482; G06F 30/398; G06F 2119/06; G06F 30/18; G06F 16/2379; G06F 30/31; G06F 30/3953; H01L 27/11807; H01L 2027/11881; H01L 2027/11888; H01L 23/5286; H01L 2027/11875; H01L 27/0207
USPC .................................................. 716/118–125
See application file for complete search history.

(56) References Cited

U.S. PATENT DOCUMENTS

| 8,914,765 | B2* | 12/2014 | Sigal ...................... | G06F 30/394 |
| | | | | 716/133 |
| 2011/0304052 | A1* | 12/2011 | Turner .................. | G06F 30/394 |
| | | | | 257/E23.079 |
| 2015/0371959 | A1* | 12/2015 | Frederick, Jr. ........ | G06F 30/394 |
| | | | | 361/748 |
| 2017/0294448 | A1* | 10/2017 | Debacker .......... | H01L 27/11807 |
| 2018/0111158 | A1* | 4/2018 | Tanikawa ................ | B32B 27/20 |
| 2018/0218106 | A1* | 8/2018 | Delk ..................... | G06F 30/394 |
| 2018/0314785 | A1* | 11/2018 | Schultz .................. | G06F 30/39 |

\* cited by examiner

*Primary Examiner* — Binh C Tat
(74) *Attorney, Agent, or Firm* — Pramudji Law Group PLLC; Ari Pramudji

(57) ABSTRACT

Various implementations described herein refer to a method for providing a cell layout with a power grid distribution network. The method may include analyzing porosity of the cell layout to identify blocked tracks and unblocked tracks. The method may include marking the unblocked tracks as available sites for stitching power rails of the cell layout to the power grid distribution network. The method may include generating a porosity report for the cell layout, and the porosity report may list the available sites as modifiable to enhance power grid porosity of the cell layout.

13 Claims, 5 Drawing Sheets

POWER GRID POROSITY TECHNIQUES

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

The power-hungry designs of the modern chip demand a robust power network that supplies required power. Robust power networks are expensive and consume more routing (signal) space as power straps are added. As such, there exists a need to improve physical design implementation of desired strap pitches while creating cell layouts.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to power grid porosity schemes and techniques that improve power grid porosity in a cell layout. For instance, the various schemes and techniques described herein may provide for a system or device that uses a unique methodology to resolve and improve power grid porosity and assist a user with addressing EMIR targets (i.e., electromigration, current, resistance). As such, the various schemes and techniques described herein may provide for methodologies to improve the power grid (PG) porosity for the structure of a cell layout.

In some implementations, power grid (PG) porosity refers to availability of free sites for a router to connect a power rail in a cell to a power grid (PG) distribution network at block level with a totem via connection. In some instances, the distance at which via stitches (e.g., via connections to a power grid distribution network) are connected may be defined as strides, and each cell in a standard cell library may need verification to check as to whether enough porous sites are available with respect to a defined stitch frequency (e.g., multiples of strides). Also, movement of each porous site may lead to blocking the stride frequency of other stitches, which may impact cell legalization in place and route operations. As such, in some instances, cell legalization may improve by having improved porosity for the power grid (PG), which may increase the utilization and robust connection to the power grid (PG) for improved EM and IR results.

The methodologies described herein may report valid (unblocked or available) porosity and invalid (blocked or unavailable) porosity separately to assist a chip designer with identifying changes to a cell layout that may improve PG porosity. The methodologies described herein may be implemented with unique PG analysis routines that incorporate a graphical user interface (GUI) for the chip designer to visualize blocked porous locations and unblocked porous locations for further improvement of the cell layout.

Various implementations of power grid porosity techniques will be described in detail herein with reference to FIGS. 1-5.

Figure 1:
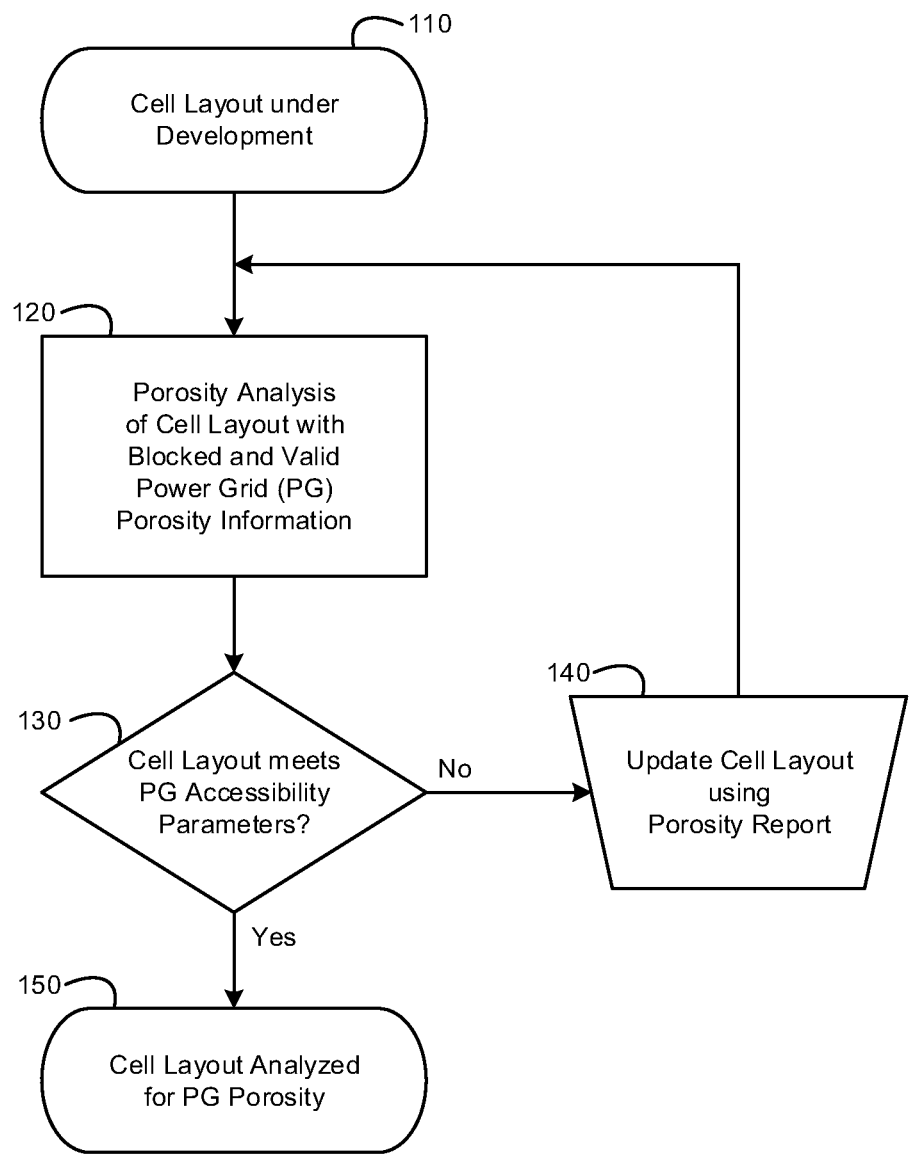
FIG. 1 illustrates a process flow diagram of a method for power grid porosity techniques in accordance with various implementations described herein.

FIG. 1 illustrates a process diagram of a method 100 for performing power grid porosity techniques in accordance with implementations described herein.

It should be understood that even though method 100 indicates a particular order of operation execution, in some cases, various certain portions of the operations may be executed in a different order, and on different systems. In other cases, additional operations and/or steps may be added to and/or omitted from method 100. Also, method 100 may be implemented in hardware and/or software. If implemented in hardware, the method 100 may be implemented with various components and/or circuitry, as described herein in reference to FIGS. 2-5. Also, if implemented in software, method 100 may be implemented as a program and/or software instruction process configured for power grid porosity schemes and techniques, as described herein. Also, if implemented in software, instructions related to implementing the method 100 may be stored in memory and/or a database. For instance, a computer or various other types of computing devices having at least one processor and memory may be configured to perform method 100.

At block 110, method 100 may obtain a cell layout under development. In some instances, method 100 may access power grid information related to the cell layout, and method 100 may provide the cell layout with a power grid distribution network. The power grid distribution network may be configured to provide one or more power supplies (e.g., Vdd and/or Vss) to one or more components via the power rails.

In reference to power network design of integrated circuitry, electrical power is typically distributed to various circuit components of a chip over a network of conductors on the chip. In some instances, power network design refers to the analysis and design of power grid distribution networks. Generally, designs of power grid distribution networks may need adequate performance, may be sufficiently reliable, and should not typically use more resources than needed. The power grid distribution network may be configured to distribute supply voltages (e.g., Vdd) and ground voltages (e.g., Vss or Gnd) from pad locations to one or more or all devices in a power network design. In some instances, shrinking device dimensions, faster switching frequencies and/or increasing overall power consumption in deep sub-micrometer technologies may cause large switching currents to flow in the power grid network, which may degrade performance and reliability. Generally, a robust power grid distribution network may be essential to ensure reliable operation of integrated circuitry on a chip. Also, power supply integrity verification may be an important concern in high-performance circuit designs. For instance, due to interconnect resistance of the power grid distribution network, there may be an IR voltage drop across the network, wherein a package may supply current to pads of a power grid with package leads in wire-bonded chips or with bump arrays in flip-chip technology. Even though resistance of a package may be quite small, inductance of package leads may be significant, which may cause a voltage drop at pad locations due to time varying current drawn by the devices on die. This voltage drop may be referred to as the di/dt-drop, and thus, the voltage seen at the devices may be the supply voltage minus the IR-drop and di/dt-drop.

At block 120, method 100 may analyze porosity of the cell layout having blocked and valid power grid (PG) porosity information associated with tracks. In some instances, method 100 may analyze porosity of the cell layout so as to identify blocked tracks and unblocked tracks. Also, method 100 may mark the unblocked tracks as available sites for stitching power rails of the cell layout to the power grid distribution network. Also, method 100 may mark the blocked tracks as unavailable sites for stitching power rails of the cell layout to the power grid distribution network. The unblocked tracks refer to valid porosity sites, and the blocked tracks refer to invalid porosity sites.

At decision block 130, method 100 may determine whether the cell layout meets power grid (PG) accessibility parameters. If yes, then method 100 proceeds to block 150. Otherwise, if no, then method proceeds to block 140. In some instances, method 100 may generate a porosity report for the cell layout, and the porosity report lists the available sites as modifiable to enhance power grid porosity of the cell layout. The porosity report may include information related to a stride frequency that is used to determine a number of available sites in the cell layout. The porosity report may include porosity information that is related to the blocked tracks along with the unblocked tracks so as to determine a number of available sites in the cell layout.

At block 140, method 100 may update the cell layout using a porosity report that is generated based on the power grid (PG) accessibility parameters, and then method 100 returns to block 120 for re-analysis of the porosity of the updated cell layout. As such, in some instances, the structure of the cell layout may be updated or modified based on the porosity report so as to improve porosity of the cell layout. For instance, the cell layout may be modified based on the porosity report so as to increase porosity of the cell layout by increasing a number of available sites in the cell layout.

At block 150, method 100 may provide the cell layout as a cell layout analyzed for power grid (PG) porosity. Also, in some instances, at block 150, method 100 may provide the porosity report to a user. For instance, method 100 may provide an interface to a user (e.g., a graphical user interface (GUI)) for visualizing the blocked tracks as invalid porous locations and the unblocked tracks as valid porous locations. In addition, various other power grid (PG) porosity information may be provided to the user.

As such, in some instances, method 100 may include providing the interface to a user for visualizing blocked tracks as invalid porous locations and unblocked tracks as valid porous locations. The interface may include a user interface (e.g., UI or GUI) that is displayed to the user via a display monitor or similar. In some instances, the UI may be configured to receive various parameters and/or preferences from the user for managing, operating, and/or controlling operational features of method 100. Therefore, in various instances, the display device may be used for providing output to the user, and the display device may include displaying the UI for receiving input from the user. An example of a user interface (UI) is shown and described herein below in reference to FIG. 4, and an example of a computer system having a display device for providing and using the UI is shown and described herein below in reference to FIG. 5.

Figure 2:
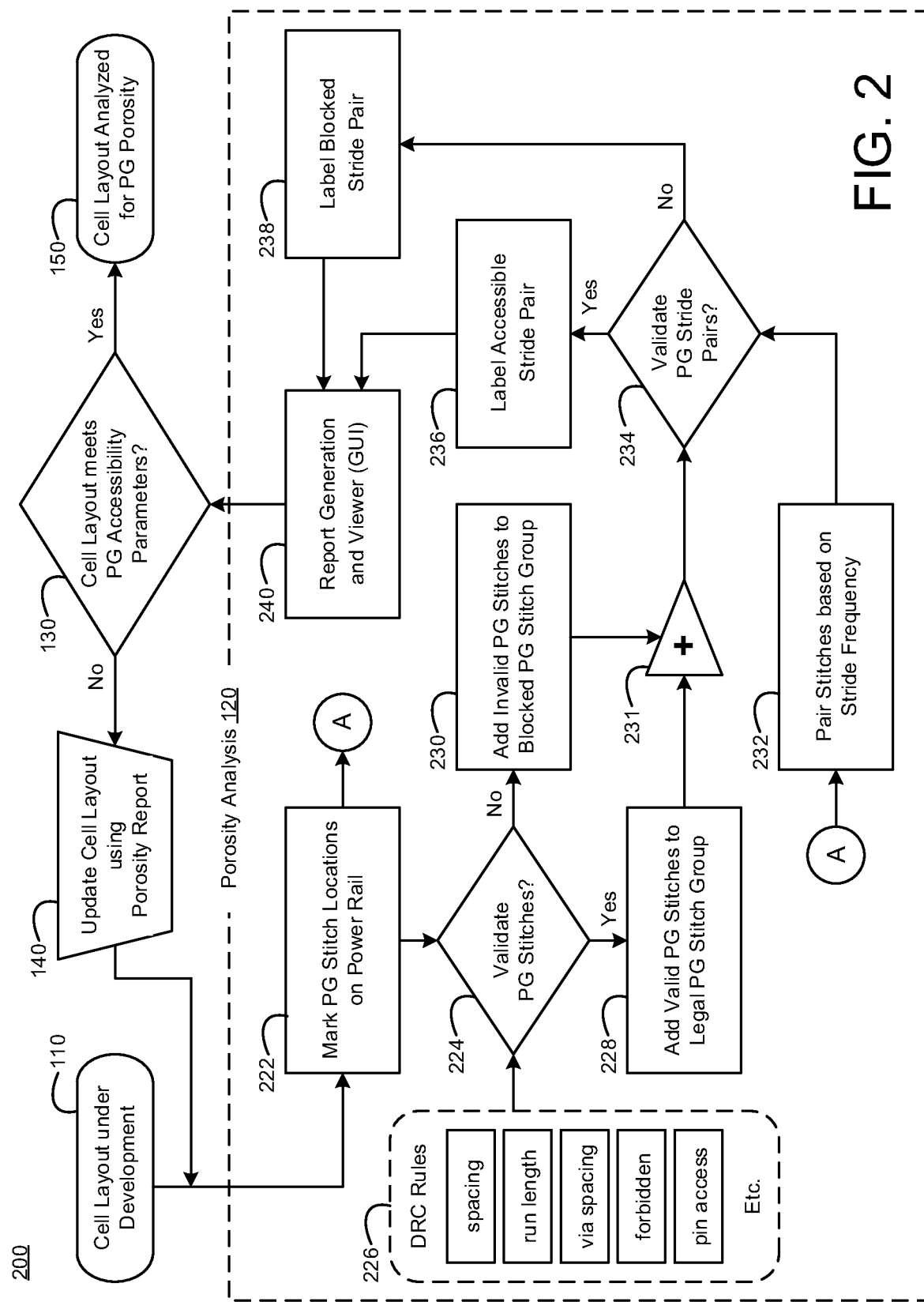
FIG. 2 illustrates a process flow diagram of a method for porosity analysis technique in accordance with various implementations described herein.

FIG. 2 illustrates a process flow diagram of a method 200 for porosity analysis technique 120 in accordance with implementations described herein. In some instances, the porosity analysis technique 120 in FIG. 2 may refer to the features, behaviors and operations as described in reference to block 120 in FIG. 1. Also, blocks 110, 130, 140 and 150 in FIG. 2 refer to similar features, behaviors and operational characteristics as described in reference to similar blocks 110, 130, 140 and 150 in FIG. 1.

At block 110, the cell layout under development may be obtained. At block 222, method 200 marks power grid (PG) stitch locations on the power rail, and this information is provided to block 232. Also, from block 222, method proceeds to decision block 224, wherein method 200 attempts to validate the PG stitches and determine whether the PG stitches are validated. In various instances, method 200 may utilize DRC rules 226 that may include various parameters to validate the PG stitches and/or the PG stitch locations based on various aspects of the DRC rules. Generally, DRC refers to various design rule checking standards that impose geometric constraints on printed circuit boards (PCBs), semiconductor devices, and integrated circuitry so as to assist with ensuring that designs function properly, reliably, and are produced with acceptable yield. For instance, method 200 may evaluate spacing rules, run length rules, via spacing rules, forbidden rules, pin access rules, and/or various other features, behaviors and operations related to these rules or similar. Thus, from decision block 224, if yes, then method 200 proceeds to block 228, and if no, then method proceeds to block 230.

Generally, design rules refer to a set of parameters provided by semiconductor manufacturers that enable a chip designer to verify accuracy of a mask set. Design rules are typically specific to a particular semiconductor manufacturing process, and a design rule set may specify particular geometric and connectivity restrictions so as to ensure sufficient margins that may account for variability in various semiconductor manufacturing processes to ensure that the circuitry works appropriately. Design rule checking (DRC) may be used to achieve a higher overall yield and reliability for a design. For instance, if design rules are violated, the design may not be functional. Also, to achieve a production goal of improving die yields, DRC typically involves design rules that modify and/or change existing features, insert new features and/or check an entire design for process limitations, such as, e.g., layer density. In some instances, a cell layout may include the geometric representation of the design and also data that provides support for manufacture of the design. While design rule checks may not validate that the design will operate correctly, the design rule checks may be constructed to verify that the structure meets the process constraints for a given design type and process technology.

At block 228, method 200 may add (or incorporate) the valid PG stitches as an informational characteristic to a legal PG stitch group. Otherwise, at block 230, method 200 may add (or incorporate) invalid PG stitches as an informational characteristic to a blocked PG stitch group. At block 231, method 200 may combine information gained from blocks 228 and 230 into a repository for PG porosity information. At decision block 234, method may receive information related to the marked PG stitch locations from block 222 (via the encircled element A) and determine whether PG stride pairs are validated based on information related to the marked PG stitch locations, the valid PG stitches, and/or the invalid (or blocked) PG stitches. If yes, then at block 236, method 200 may label the stride pair as accessible (or unblocked, or available), and if no, then at block 238, method 200 may label the stride pair as inaccessible (or blocked, or unavailable). Then, at block 240, method 200 may generate a porosity report based on the stride pair information related to accessibility or inaccessibility of the cell layout. From block 240, method 200 may return to decision block 130 so as to determine whether the cell layout meets PG accessibility parameters based on the porosity report and related porosity information.

Figure 3:
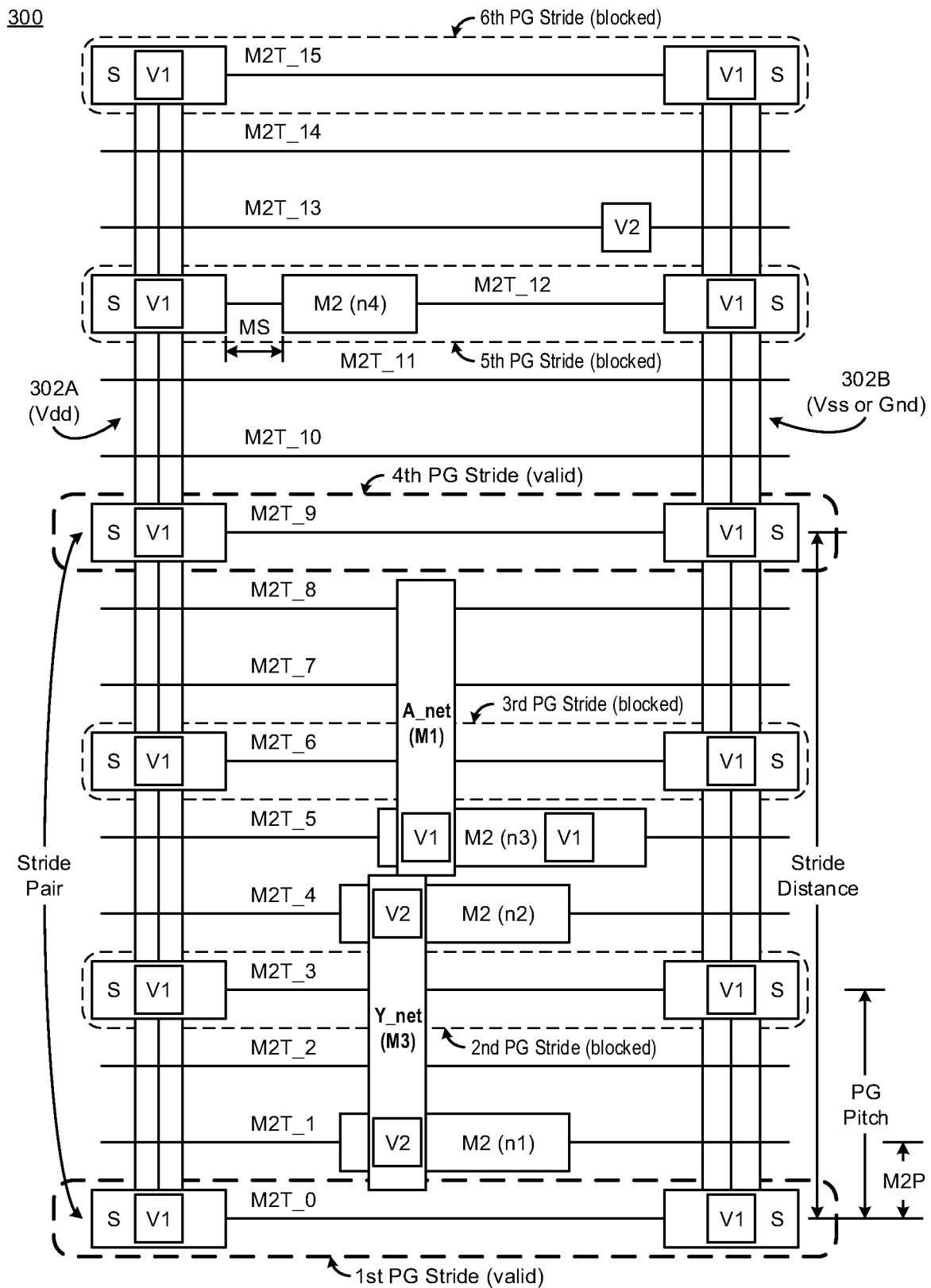
FIG. 3 illustrates a diagram of power grid circuitry in accordance with various implementations described herein.

In some implementations, at block 150, once the cell layout is analyzed for PG porosity, method 200 (or method 100) may stitch power rails to the power grid distribution network with straps and identify a distance between each strap as a power grid stride, as shown in FIG. 3. Also, method 200 (or method 100) may define stride frequency as multiple power grid strides, and the porosity report may include information related to the PG strides and the stride frequency that is used to determine a number of available sites (i.e., unblocked tracks) in the cell layout. Also, at block 140, method 200 (or method 100) may modify the cell layout based on the porosity report so as to thereby increase porosity by increasing a number of available sites (i.e., unblocked tracks) in the cell layout. In this instance, once the cell layout is modified, method 200 (or method 100) may return to block 120 for further porosity analysis, and method 200 may also return to decision block 130 to determine whether the modified cell layout meets PG accessibility parameters. Further, at block 150, method 200 may provide an interface to a user for visualizing the cell layout with blocked tracks as invalid porous locations and the unblocked tracks as valid porous locations, wherein the unblocked tracks may refer to valid porosity sites, and wherein the blocked tracks may refer to invalid porosity sites.

FIG. 3 illustrates a circuit diagram of power grid circuitry 300 in accordance with various implementations described herein.

As shown in reference to FIG. 3, the power grid circuitry 300 may include a structure comprising a cell layout having a power grid distribution network with power rails 302A, 302B and strap locations including blocked tracks and unblocked tracks that define porosity of the cell layout. In some instances, the power grid distribution network may be configured to provide a power supply (e.g., Vdd, Vss) to one or more components via the power rails. Also, the unblocked tracks may be marked as available sites for stitching the power rails of the cell layout to the power grid distribution network, and the blocked tracks may be marked as unavailable sites for stitching the power rails of the cell layout to the power grid distribution network. The cell layout may include metal layers, such as, e.g., a metal 1 layer (M1), a metal 2 layer (M2), and metal 3 layer (M3). Also, the power rails 302A, 302B may include a first power rail 302A that provides a power supply (Vdd) and a second power rail 302B that provides a ground supply (Vss or Gnd).

In some implementations, the available sites are used to identify and report modifications that enhance power grid porosity of the cell layout. The power grid circuitry 300 may include one or more straps (S) for stitching the power rails 302A, 302B to the power grid distribution network, and a distance between each strap (S) refers to a power grid stride. Also, stride frequency may refer to multiple strides, and the stride frequency may identify a number of available sites in the cell layout. In addition, in some instances, the cell layout may be modifiable based on increasing porosity of the cell layout and by increasing a number of available sites in the cell layout.

In various instances, the structure of cell layout may include any number (N) of tracks (M2T_0, M2T1, ..., M2T_N) that are formed with the metal 2 layer (M2). One or more of the tracks may be labelled as available tracks or unblocked tracks, and one or more of the tracks may be labelled as unavailable tracks or blocked tracks. As shown in FIG. 3, the available tracks or unblocked tracks may refer to tracks (PG tracks: M2T_0, M2T_9, M2T_15) that have no obstruction along the tracks between the power rails 302A, 302B. Also, the unavailable tracks or blocked tracks may refer to tracks (PG Tracks: M2T_3, M2T_6, M2T_12) that have one or more obstructions along the tracks between the power rails 302A, 302B. As shown, a power grid (PG) stride may be defined as an unblocked track disposed between the power rails 302A, 302B, and a stride pair may be defined as multiple PG strides (e.g., 2) that are group together. Also, a stride distance may be determined as a distance between stride pairs.

The cell layout may include multiple internal nets (n) and vias (V1, V2) with metal spacing (MS) between the straps. As shown in FIG. 3, one or more internal nets (n) may be disposed on the tracks with strap nets coupled between different straps (S). For instance, a first internal net (n1) may be disposed on track (M2T_2), a second internal net (n2) may be disposed on track (M2T_4), and a first strap net (Y_net) may be used to couple the first internal net (n1) and the second internal net (n2) together with vias (V). In some instances, the internal nets (n1, n2, n3, n4) may be formed in the metal 2 layer (M2), and the internal nets (n1, n2, n3, n4) may refer to metal layers inside the cell that block PG locations in the power rail. In FIG. 3, internal routes are depicted blocking PG locations due to various reasons, e.g., EM structures, pin access, via spacing rules, metal spacing rules, etc. Also, some internal metal routes do not block some PG stitch locations. Also, the first strap net (Y_net) may cross over one or more tracks (e.g., M2T_2, M2T_3) between the internal nets (n1, n2), and the first strap net (Y_net) may be disposed in the metal 3 layer (M3). In another instance, a third internal net (n3) may be disposed on track (M2T_5), and a second strap net (A_net) may be coupled to the third internal net (n3) with at least one via (V1). Also, the second strap net (A_net) may cross over one or more tracks (e.g., M2T_5, ..., M2T_8), and the second strap net (A_net) may be disposed in the metal 1 layer (M1). In some instances, a fourth internal net (n4) may be disposed alone on a single track (M2T_12), and also, a via (V2) may be disposed alone on another single track (M2T_13).

In some implementations, as shown in FIG. 3, power gate (PG) pitch may refer to a distance between two straps (S), and M2 pitch (M2P) may refer to a distance between two tracks. In some instances, the PG pitch may be different than the M2 pitch, and in other instances, the PG pitch may be the same as the M2 pitch. In FIG. 3, the PG pitch denotes available locations for PG stitches, and the power grid porosity schemes and techniques described herein determine whether the PG locations are blocked (invalid) or unblocked (valid). Some track locations having the M2 pitch may not be referred to as a valid PG location, and the PG strides may be formed with valid PG locations, e.g., in tracks M2T_0, M2T_3, M2T_6, M2T_9, M2T_12, M2T_15. Also, in some instances, only M2T_0, M2T_9 are considered valid PG locations due to being consistent with the stride frequency, and M2T_0, M2T_9 are clean from other DRC errors.

Also, as shown in FIG. 3, the first PG stride and the fourth PG stride are valid PG locations for PG placement. The second PG stride is blocked to honor EM guidelines, and the third PG stride is blocked to provide pin access for a pin in the VDD side and for via spacing rule (e.g., same mask) in the VSS side. The fifth PG stride is blocked due to metal spacing at the VDD side and the V1-to-V2 spacing at the VSS side. The sixth stride is blocked because its corresponding stride towards the left (i.e., fifth stride) is blocked.

Figure 4:
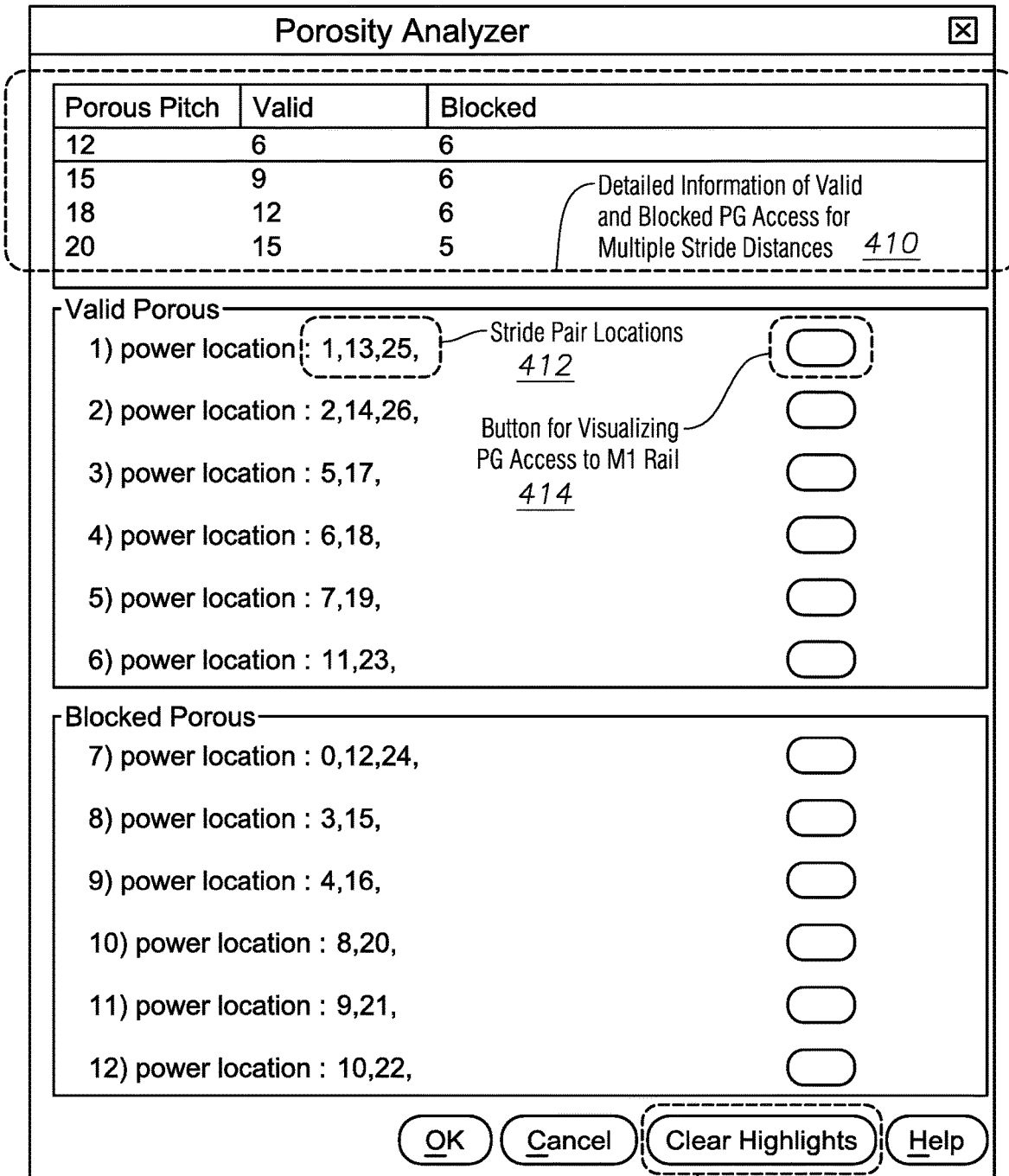
FIG. 4 illustrates a diagram of a user interface for porosity analysis schemes and techniques in accordance with implementations described herein.

FIG. 4 illustrates a diagram of an interface 400 for porosity analysis schemes and techniques in accordance with various implementations described herein.

As shown in FIG. 4, the interface 400 may include a graphical user interface (GUI) that provides information associated with porosity analysis to a user via a computer display or similar monitor. The interface 400 may be referred to as porosity analyzer that provides power grid (PG) porosity information related to valid (or unblocked, or available) porous locations and invalid (or blocked, or unavailable) porous locations. Also, the PG porosity information may refer to detailed porosity information 410 of valid and unblocked PG access for multiple stride distances, along with invalid and blocked PG access for the multiple stride distances. In some instances, the porosity information 410 may refer to one or more porous pitches along with a corresponding valid and blocked tracks. The PG porosity information may refer to stride pair locations 412 associated with the structure of the cell layout. The PG porosity information may allow for the user to select a button 414 for visualizing the PG access to the metal one layer (M1) related to the structure of a cell layout. The PG porosity information may allow for a user to select another button 418 for resetting visualization of the updated or modified cell layout to the original cell layout.

Figure 5:
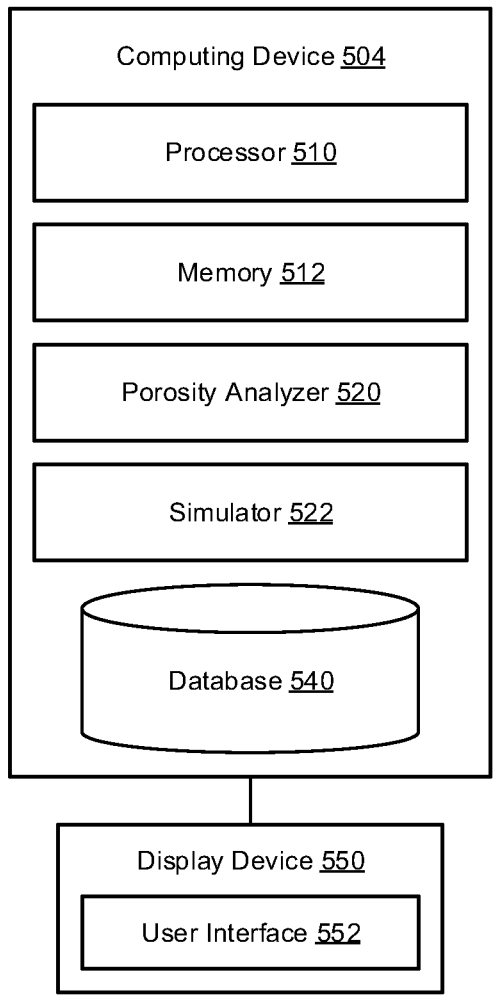
FIG. 5 illustrates a diagram of a system for analyzing porosity of a power grid in physical design in accordance with implementations described herein.

FIG. 5 illustrates a diagram of a system 500 for analyzing porosity of a power grid in physical design in accordance with implementations described herein.

In reference to FIG. 5, the system 500 may be associated with at least one computing device 504 that is implemented as a special purpose machine configured for implementing power grid porosity techniques in physical design. In some instances, the computing device 504 includes any standard element(s) and/or component(s), including at least one processor 510, memory 512 (e.g., non-transitory computer-readable storage medium), one or more database(s) 540, power, peripherals, and various other computing elements and/or components that may not be specifically shown in FIG. 5. Also, the computing device 504 may include instructions recorded or stored on the non-transitory computer-readable medium 512 that are executable by the at least one processor 510. The computing device 504 may be associated with a display device 550 (e.g., a monitor or other display) that may be used to provide a user interface (UI) 552, such as, e.g., a graphical user interface (GUI). In some instances, the UI or GUI 552 may be configured to receive various parameters and/or preferences from a user for managing, operating, and/or controlling the computing device 504. Thus, the computing device 504 may include the display device 550 for providing output to a user, and also, the display device 550 may include the UI 552 for receiving input from the user.

In reference to FIG. 5, the computing device 504 may include a porosity analyzer 520 that may be configured to cause the at least one processor 510 to implement various schemes and techniques described herein in reference to FIGS. 1-4, including power grid porosity schemes and techniques related to implementing integrated circuitry in physical design. The porosity analyzer 520 may be implemented in hardware and/or software. In some instances, if implemented in software, the porosity analyzer 520 may be stored in memory 512 or database 540. Also, in other instances, if implemented in hardware, the porosity analyzer 520 may be a separate processing component that is configured to interface with the processor 510. In addition, the porosity analyzer 520 may operate as a placement director that is configured to place, land and/or dispose the power grid straps between components and the power grid architecture.

In some instances, the porosity analyzer 520 may be configured to cause the at least one processor 510 to perform various operations, as provided herein in reference to power grid porosity schemes and techniques described in FIGS. 1-4. In this instance, the memory 512 has stored thereon instructions that, when executed by the processor 510, cause the processor 510 to perform one or more of the following operations.

For instance, the porosity analyzer 520 may be configured to cause the at least one processor 510 to analyze porosity of a cell layout so as to identify stitch locations including blocked tracks and unblocked tracks, mark the unblocked tracks as available sites for stitching power rails of the cell layout to a power grid distribution network, and provide a porosity report for the cell layout, wherein the porosity report lists the available sites as modifiable to enhance power grid porosity of the cell layout. In some instances, the power grid distribution network may be configured to provide a power supply to one or more components via the power rails.

In some instances, the porosity analyzer 520 may be configured to cause the at least one processor 510 to stitch the power rails to the power grid distribution network with straps and identify a distance between each strap as a power grid stride. The porosity analyzer 520 may be configured to cause the at least one processor 510 to define stride frequency as multiple power grid strides and pair stitches based on stride frequency. The porosity report may include information related to the stride frequency that may be used to determine a number of available sites in the cell layout. The porosity analyzer 520 may be configured to cause the at least one processor 510 to modify the cell layout based on the porosity report to thereby increase porosity of the cell layout by increasing a number of available sites in the cell layout. The porosity analyzer 520 may be configured to cause the at least one processor 510 to provide the interface to a user for visualizing the blocked tracks as invalid porous locations and the unblocked tracks as valid porous locations.

In accordance with various implementations described herein in reference to FIGS. 1-4, any one or more or all of these operations performed by the porosity analyzer 520 may be altered, modified, changed and/or updated so as to thereby provide various specific embodiments as shown in FIGS. 1-4. Further, in some instances, each of the power grid components may be in a form of a physical structure having various shapes with length, width and/or various other spatial definitions, and the physical structure may be associated with an integrated circuit that is included in a place and route environment for DRC and various rules associated therewith.

Further, in reference to FIG. 5, the computing device 504 may include a simulator 522 that is configured to cause the at least one processor 510 to generate one or more simulations of the cell layout and related components. The simulator 522 may be referred to as a simulating component or module that may be implemented in hardware or software.

If implemented in software, the simulator 522 may be recorded and/or stored in memory 512 or database 540. If implemented in hardware, the simulator 520 may be a separate processing component configured to interface with the processor 510. In some instances, the simulator 522 may refer to a SPICE simulator that is configured to generate SPICE simulations of the cell layout and related components. Generally, SPICE refers to an acronym for Simulation Program with Integrated Circuit Emphasis, which is an open source analog electronic circuit simulator. Also, SPICE may refer to a general-purpose software program used by the semiconductor industry to check the integrity of physical structure designs and to predict the behavior of physical structure designs. Thus, in some instances, the porosity analyzer 520 may be configured to interface with the simulator 522 so as to generate various timing data based on one or more simulations (including, e.g., SPICE simulations) of the cell layout and related components that are used for analyzing performance characteristics of the integrated circuit including timing data of the cell layout and related components. Also, the porosity analyzer 520 may be configured to use the one or more simulations (including, e.g., SPICE simulations) of the cell layout and related components for evaluating operating behavior and conditions thereof.

In some implementations, the computing device 504 may include one or more databases 540 configured to store and/or record various data and information related to implementing power grid porosity techniques in physical design. In various instances, the database(s) 540 may be configured to store and/or record data and information related to integrated circuitry, operating conditions, operating behavior and/or timing data of the cell layout and related components. Also, the database(s) 540 may be configured to store data and information related to the cell layout and related components and timing data in reference to simulation data (including, e.g., SPICE simulation data).

Described herein are various implementations of a method. The method may include providing a cell layout with a power grid distribution network and analyzing porosity of the cell layout to identify blocked tracks and unblocked tracks. The method may include marking the unblocked tracks as available sites for stitching power rails of the cell layout to the power grid distribution network. The method may include generating a porosity report for the cell layout, and the porosity report may list the available sites as modifiable to enhance power grid porosity of the cell layout.

Described herein are various implementations of a structure. The structure may include a cell layout having a power grid distribution network and power rails. The structure may include strap locations including blocked tracks and unblocked tracks that define porosity of the cell layout. The unblocked tracks may be marked as available sites for stitching the power rails of the cell layout to the power grid distribution network.

Described herein are various implementations of a system. The system may include a processor and memory having stored thereon instructions that, when executed by the processor, cause the processor to analyze porosity of a cell layout to identify stitch locations including blocked tracks and unblocked tracks. The instructions may cause the processor to mark the unblocked tracks as available sites for stitching power rails of the cell layout to a power grid distribution network. The instructions may cause the processor to provide a porosity report for the cell layout, and the porosity report may list the available sites as modifiable to enhance power grid porosity of the cell layout.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
providing a cell layout with a power grid distribution network;
analyzing porosity of the cell layout to identify blocked tracks having one or more obstructions and unblocked tracks that are free of obstructions, wherein the unblocked tracks refer to valid porosity sites, and wherein the blocked tracks refer to invalid porosity sites;
marking the unblocked tracks as available sites for stitching power rails of the cell layout to the power grid distribution network;
generating a porosity report for the cell layout, wherein the porosity report lists the available sites as modifiable to enhance power grid porosity of the cell layout; and
stitching power rails of the cell layout to the power grid distribution network based on the porosity report;
stitching the power rails to the power grid distribution network with straps;
identifying a distance between each strap as a power grid stride; and
defining a stride frequency as multiple power grid strides, wherein the porosity report includes information related to the stride frequency that is used to determine a number of available sites in the cell layout.

2. The method of claim 1, wherein the power grid distribution network is configured to provide a power supply to one or more components via the power rails.

3. The method of claim 1, further comprising:
modifying the cell layout based on the porosity report so as to increase porosity by increasing a number of available sites in the cell layout.

4. The method of claim 1, wherein the porosity report includes porosity information related to the blocked tracks along with the unblocked tracks so as to determine a number of available sites in the cell layout.

5. The method of claim 1, further comprising:
providing an interface to a user for visualizing the blocked tracks as invalid porous locations and the unblocked tracks as valid porous locations.

6. A structure, comprising:
a cell layout having a power grid distribution network and power rails; and
strap locations including blocked tracks, having one or more obstructions, and unblocked tracks, that are free of obstructions, that define porosity of the cell layout;
wherein:
the unblocked tracks are marked as available sites for stitching the power rails of the cell layout to the power grid distribution network; and
the power rails of the cell layout are stitched to the power grid distribution network based on the defined porosity; and
straps for stitching the power rails to the power grid distribution network,
wherein a distance between each strap refers to a power grid stride;
wherein a stride frequency refers to multiple strides, and wherein the stride frequency identifies a number of available sites in the cell layout.

7. The structure of claim 6, wherein the available sites are used to identify and report modifications that enhance power grid porosity of the cell layout.

8. The structure of claim 6, wherein the power grid distribution network is configured to provide a power supply to one or more components via the power rails.

9. The structure of claim 6, wherein the cell layout is modifiable based on increasing porosity of the cell layout by increasing a number of available sites in the cell layout.

10. A system, comprising:
a processor; and
memory having stored thereon instructions that, when executed by the processor, cause the processor to:
analyze porosity of a cell layout to identify stitch locations including blocked tracks, having one or more obstructions, and unblocked tracks, that are free of obstructions;
mark the unblocked tracks as available sites for stitching power rails of the cell layout to a power grid distribution network;
provide a porosity report for the cell layout, wherein the porosity report lists the available sites as modifiable to enhance power grid porosity of the cell layout;
stitch power rails of the cell layout to the power grid distribution network based on the porosity report;
stitch the power rails to the power grid distribution network with straps;
identify a distance between each strap as a power grid stride;
define stride frequency as multiple power grid strides; and
pair stitches based on stride frequency,
wherein the porosity report includes information related to the stride frequency that is used to determine a number of available sites in the cell layout.

11. The system of claim 10, wherein the power grid distribution network is configured to provide a power supply to one or more components via the power rails.

12. The system of claim 10, wherein the instructions further cause the processor to:
modify the cell layout based on the porosity report so as to increase porosity of the cell layout by increasing a number of available sites in the cell layout.

13. The system of claim 10, wherein the instructions further cause the processor to:
provide an interface to a user for visualizing the blocked tracks as invalid porous locations and the unblocked tracks as valid porous locations.

* * * * *